United States Patent
Samdahl et al.

[11] Patent Number: 6,008,923
[45] Date of Patent: Dec. 28, 1999

[54] MULTIPLE BEAM COMMUNICATION NETWORK WITH BEAM SELECTIVITY

[75] Inventors: Roger Samdahl, San Jose; Richard A. Milewski, Sunnyvale, both of Calif.

[73] Assignee: Netschools Corporation, Santa Clara, Calif.

[21] Appl. No.: 09/040,330

[22] Filed: Mar. 16, 1998

[51] Int. Cl.⁶ .................................................. H04B 10/00
[52] U.S. Cl. ........................ 359/172; 359/152; 359/159
[58] Field of Search ................................. 359/172, 152, 359/159, 125, 113, 117; 340/825–72

[56] References Cited

U.S. PATENT DOCUMENTS

| | | | |
|---|---|---|---|
| 4,456,793 | 6/1984 | Baker et al. | 359/125 |
| 4,727,600 | 2/1988 | Avakian | 359/172 |
| 4,975,926 | 12/1990 | Knapp | 359/125 |
| 5,424,859 | 6/1995 | Uehara et al. | 359/152 |
| 5,563,728 | 10/1996 | Allen et al. | 359/172 |
| 5,566,022 | 10/1996 | Segeu | 359/172 |
| 5,724,168 | 3/1998 | Oschmann et al. | 359/172 |

*Primary Examiner*—Kinfe-Michael Negash
*Attorney, Agent, or Firm*—Townsend and Townsend and Crew LLP; Kenneth R. Allen

[57] ABSTRACT

A space multiplexed wireless interconnection system employs an array of overhead access points in a first plane and selected client node points at arbitrary locations and orientations in a second plane, with server transceivers disposed in an ordered array at the access points and illuminating a radiation region over a substantial portion in said second plane, and with at least one complementary transceiver disposed in the second plane in a client node host device, wherein at least one of the complementary transceivers provides a radiation and reception pattern sufficiently narrow to capture one and only one of the first access points for a session of communication so that the server transceivers can control communication with multiple complementary transceivers and each complementary transceiver can communicate with only one server transceiver.

11 Claims, 1 Drawing Sheet

MULTIPLE BEAM COMMUNICATION NETWORK WITH BEAM SELECTIVITY

BACKGROUND OF THE INVENTION

This invention relates to wireless data communication and especially to multipoint-to-multipoint wireless interconnection. More particularly, this invention relates to a networking system operable within an educational institution environment having a plurality of classroom areas, each having a different teaching environment and wherein students employ unique portable workstations, and wherein systems and methods are needed to configure portable computers according to location and intended application so as to limit interference and optimize network resources.

A wireless local area network system must rely on the ability of a client node to establish reliable communication with an network access point. In a classroom environment using infrared (IR) links, network access points are typically a fixed bidirectional array of photodetectors and IR photo-emitters located above the classroom work area in or adjacent the ceiling, called ceiling access points (CAPs). The client node, typically a portable computer, must be equipped with compatible IR transceiving apparatus. One solution is to provide as the IR transceiving apparatus multiple fixed directional transceiving arrays. It is a challenge to be able to place a client node anywhere within the access space and establish reliable but non-interference-inducing communication with the CAPs. If multiple CAPs intercept the same IR beam, interference can result. If no CAP intercepts any IR beam, then a link cannot be established. What is needed is a configuration which addresses and solves this problem.

SUMMARY OF THE INVENTION

According to the invention, a space multiplexed wireless interconnection network system comprises an array of overhead access points in a first plane and selected client node points at arbitrary locations and orientations in a second plane, with server transceivers disposed in an ordered array at the access points and illuminating a radiation region over a substantial portion in said second plane, and with at least one complementary transceiver disposed in the second plane in a client node host device, wherein at least one of the complementary transceivers provides a radiation and reception pattern sufficiently narrow to capture one and only one of the first access points for a session of communication so that the server transceivers can control communication with multiple complementary transceivers and each complementary transceiver can communicate with only one server transceiver.

According to a specific embodiment of the invention, a wireless interconnection system comprises an array of local area network access points situated on the ceiling of a room (ceiling access points) and transceiver-equipped notebook computers or other user devices placed facing any direction on table-tops anywhere in the room, each equipped with a fixed array of highly directional beams configured to intercept only one ceiling access point. In the preferred embodiment, the transceiver beam intercepting the ceiling access point plane is circular and has a diameter slightly greater than the distance between adjacent ceiling access points and less than the distance between the next closest spacing of ceiling access points. In a preferred configuration the ceiling access points are arranged in a Cartesian grid of four adjacent points around a central point and the transceiver-equipped client device includes five transmitting elements and five receiving elements, with each transmitting element arranged to direct its beam at an apex point of a pentagon and each receiving element disposed to intercept a signal from the same field of view and the beam of the corresponding transmitting element. A paired transmitting element and receiving element constitutes a transceiver. An array of transceivers constitutes a transceiver head. By providing a mismatch in the order of the symmetry of the number of optical systems in the client device (five) as compared to the access device (four), then at least one lobe of the client device will always see exactly one access point.

The invention will be better understood by reference to the following detailed description of a specific embodiment in connection with the accompanying drawings.

DESCRIPTION OF SPECIFIC EMBODIMENTS

Figure 1:
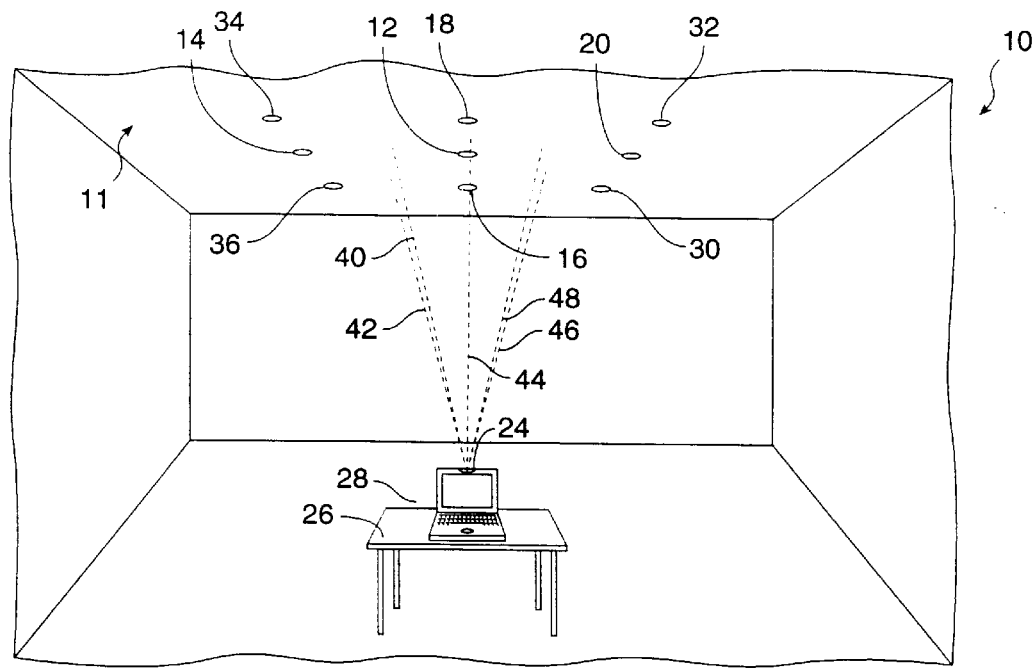
FIG. 1 is a perspective view of a room for illustrating a specific embodiment of the invention.

Referring to FIG. 1, there is shown a specific embodiment of the invention in a room 10 housing an infrared network for interconnecting computers. In an overhead plane 11, ceiling access points 12, 14, 16, 18, 20 are in a field of view of beams 40, 42, 44, 46, 48 of a client transceiver array 24 in a tabletop plane 26 on for example a laptop computer 28, whereas other ceiling access points 30, 32, 34, 36 are not in the narrow field of view of any of the beams. (These other ceiling access points may be in the field of view of beams of other devices.)

In a preferred embodiment, the ceiling access points 12 comprise a single channel infra-red transceiver that uses, as transmitting elements, an array of preferably five infra-red light-emitting diodes or stimulated emitters (not shown) with appropriate lensing elements (not shown), each forming a sharply-defined radiation pattern having a circular footprint at the plane of the receiving elements. A receiver comprises a set of silicon PIN diode detectors (or other suitable detectors of limited view area) typically mounted adjacent to the array of emitters. Their field of view and beam width are coextensive. The field of view of the ceiling access point 12 detectors is limited to some angle less than 180 degrees so that ceiling access point 12 detectors cannot see the transmitters of other ceiling access points in the array.

Figure 2:
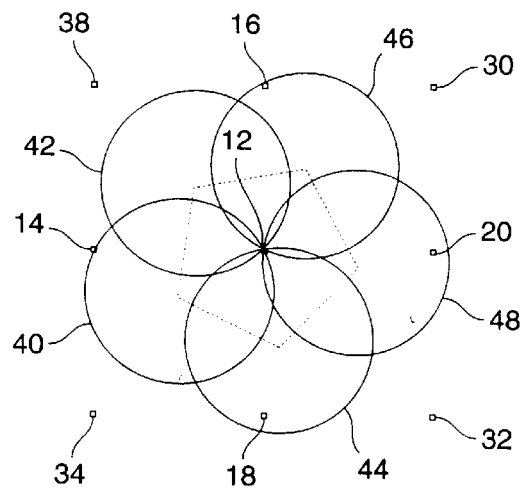
FIG. 2 is a top-down view of an array of ceiling access points showing beam patterns from a transceiver below the ceiling access points.

Referring also to FIG. 2, directed straight down into the parallel plane 26 of the tabletop with any conical field of view less than 180 degrees, the detector in the ceiling access point 12 will always have in view the source 24 of the upward pointing beam 42 that intercepts only one ceiling access point. Other beams 40, 44, 46, 48 will have in view two ceiling access points each. A configuration wherein the source 24 is directly below a ceiling access point is the most difficult case. At any other lateral position, more than one beam will view only one ceiling access point. Preferably, all pointing beams from a single source 24 that do not need to communicate to the ceiling access point 12 are switched off for the duration of any communication session, although shut-off is not required. It is contemplated that a single source 24 would communicate with only one ceiling access point 12 during any session.

In each transceiver 12, the PIN diodes or other detectors are equipped with filters (not shown) to limit detected radiation to that portion of the infra-red spectrum around the peak output wavelength of the transmitting diodes. This limits noise signals from sources of visible light within the room.

In the preferred embodiment, the client device transceiver 24 contains a five-channel fixed position infra-red transceiver that uses infra-red light-emitting diodes as transmitting elements which are apertured to project a bounded circular beam pattern at the plane of the ceiling access points. Alternatively, laser diodes with an optical expansion lens. (A form of concave lens or binary lenses could likewise be used.) PIN diodes are preferably used as detectors because of their physically small size and high sensitivity as compared to other types of detectors.

As in the ceiling access points, the PIN diodes are equipped with filters (not shown) to limit detected radiation to that portion of the infra-red spectrum around the peak output wavelength of the transmitting diodes and to inhibit noise signals from sources of visible light within the room 10.

The field of view of each of the five channels is limited in order to project a restricted and circular area on the plane of the CAPs in ceiling above the client device. It is essential that the field of view of the transmitter be coincident with the field of view of the detector (i.e., the transmitter cannot illuminate parts of the ceiling that the detector cannot see, and conversely, the detector cannot see parts of the ceiling that the transmitter cannot illuminate in order to avoid the commingling of spatially separate channels.) In a room 10 with ceilings ten feet above the floor, and with the client node device 28 on the plane 26 of a table two and one-half feet above the floor and the transceiver 24 twelve inches above the table, a preferred embodiment of a single beam provides a circular area of illumination of a diameter of approximately seventeen feet, with a dropoff at the edges of the beam of at least one-half power at twelve inches outside the circle of the beam. Ceiling access points are disposed on a fifteen foot grid in a ten-foot ceiling. The beams overlap slightly at the center so that a ceiling access point 12 can be accessed even if directly over a source 24. The maximum diameter of influence of the beam set is less than thirty-four feet.

Referring to FIG. 2, the fields of view of the five channels overlap to form a pattern of five circles with the centers of the circles at the apex points of a regular pentagon with a side of ten feet.

To establish a connection with the local area network which is hardwired or otherwise linked to the ceiling access points, the client device 28 listens for beacon signals from the ceiling access points on each of the five channels. Channels on which no beacon signals are detected are ignored because no ceiling access points lie within the field of view of those channels. Channels on which beacon signals from more than one ceiling access point are heard are not used because communicating with one ceiling access point would jam conversations between the other ceiling access points and other user devices in the room. Channels on which beacon signals from a single ceiling access point are heard can be used to establish a connection with the network.

For a sample room 10 with ten-foot ceilings, by arranging the ceiling access points 12, etc., in a square pattern with a fifteen-foot distance between adjacent ceiling access points, the five-petal pattern (FIG. 2) from the client device channels are guaranteed to provide at least one channel in which beacon signals from one and only one ceiling access point can be detected and hence at least one channel which can be used to establish a network connection. For rooms with higher or lower ceilings, the fifteen foot ceiling access point spacing must be adjusted proportionately to the tabletop-to-ceiling distance.

The invention has applications outside of the enclosed classroom, as for example in any environment where there are overhead nodes and nodes in different planes. Examples are highly-directional transceiving systems involving cellular and terrestrial two-way radio signals and highly directional transceiving systems using low-earth orbiting satellites. Various devices can be used, such as a portable personal computer, a printer, earphones, an instrument, a remote sensing device, a remote data storage device, a remote data collection device, display device, a robotics device. In an alternative embodiment, a single transceiver PIN/LED pair mounted on the client device but which can step between an odd number of fixed positions, such as along a circular arc, could produce the same sort of isolation as a fixed multiple-beam client transceiver system. Fixed beam systems are conventionally considered more robust and less expensive, particularly for classroom applications. In a preferred practical approach, two adjacent beams of five transmitters could be simultaneously activated in an array scanning pattern to establish communication with an access point.

The invention has been explained with reference to specific embodiments. Other embodiments, such as those noted, will be apparent to those of ordinary skill in the art. It is therefor not intended to be limited, except as indicated by the appended claims.

What is claimed is:

1. A system for space division multiplexed communication between first elements in a first plane and second elements in a second plane, said first plane being substantially parallel to said second plane, said system comprising:

first transceivers disposed in an array according to a configuration at first access points in said first plane, each one of said first transceivers illuminating a radiation region over a substantial portion in said second plane; and at least one second transceiver disposed in said second plane in a host device, said second transceiver projecting a first radiation and reception pattern directly onto said first plane with functionally uniform radiation in a first field of view with preselected attenuation outside of said first field of view, said first radiation pattern being sufficiently narrow and positioned to capture one and only one of said first access points for a session of communication so that said first transceivers can control communication with multiple second transceivers and each said second transceiver can communicate with only one first transceiver.

2. The system according to claim 1 wherein said array configuration for said first transceivers is fixed in a Cartesian grid pattern, wherein said first radiation and reception pattern of said second transceiver is circular in shape in said second plane and has a diameter not substantially exceeding the closest separation between two said first transceivers.

3. The system according to claim 2 wherein said first radiation pattern is positioned along a circle at an odd number of fixed positions.

4. The system according to claim 3 wherein said second transceiver includes an odd number of radiators at fixed positions centered on said circle and wherein said first radiation pattern of each said radiator is uniform in diameter and exceeds spacing of the closest separation between two said first transceivers.

5. The system according to claim 1 wherein said first transceivers are disposed along a ceiling of an enclosed room and wherein radiators of each said second transceiver are disposed in said host device opposing said first transceivers, and said host device being portable.

6. The system according to claim 5 wherein said portable host device is selected from the list including a portable personal computer, a printer, earphones, an instrument, a remote sensing device, a remote data storage device, a remote data collection device, display device, a robotics device.

7. The system according to claims 1 wherein said positioning is independent of placement of said host device.

8. The system according to claim 1 wherein said system is a satellite to ground communication system.

9. The system according to claim 1 wherein each said second transceiver comprises a transmitting element and a receiving element, said receiving element having a field of view substantially coextensive with the radiation pattern of said transmitting element.

10. A method for space division multiplexed communication between first elements in a first plane and second elements in a second plane, wherein said first plane is substantially parallel to said second plane, said method comprising the steps of:

disposing first transceivers in an array according to a configuration at first access points in said first plane;

illuminating with each one of said first transceivers a radiation region over a substantial portion in said second plane;

disposing in said second plane at least one second transceiver in a host device;

projecting with said at least one second transceiver a first radiation and reception pattern directly onto said first plane with functionally uniform radiation in a first field of view and with preselected attenuation outside of said first field of view, said first radiation pattern being sufficiently narrow and positioned to capture one and only one of said first access points for a session of communication so that said first transceivers can control communication with multiple second transceivers and each said second transceiver can communicate with only one first transceiver;

generating at each one of said first transceivers a beacon signal;

listening at each one of said second transceivers for said beacon signals;

if at said second transceiver a plurality of beacon signals is heard, causing at said second transceiver said radiation pattern position of said first radiation and reception pattern to change; thereafter listening again at said second transceiver for said beacon signals; and upon hearing at said second transceiver one and only one of said beacon signals, conducting a point-to-point communication session between said second transceiver and the selected first transceiver.

11. The method according to claim 10 wherein said radiation pattern is changed along a circular track.

* * * * *